(12) United States Patent
Higuchi

(10) Patent No.: US 11,149,827 B2
(45) Date of Patent: Oct. 19, 2021

(54) LINEAR DRIVE DEVICE

(71) Applicant: NIDEC SANKYO CORPORATION, Nagano (JP)

(72) Inventor: Takashi Higuchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 234 days.

(21) Appl. No.: 16/423,046

(22) Filed: May 27, 2019

(65) Prior Publication Data

US 2019/0368583 A1 Dec. 5, 2019

(30) Foreign Application Priority Data

May 31, 2018 (JP) .............................. JP2018-104346

(51) Int. Cl.
*F16H 25/20* (2006.01)
*F16H 25/24* (2006.01)

(52) U.S. Cl.
CPC .......... *F16H 25/20* (2013.01); *F16H 25/2003* (2013.01); *F16H 2025/204* (2013.01); *F16H 2025/2075* (2013.01); *F16H 2025/2445* (2013.01)

(58) Field of Classification Search
CPC ....... F16H 2025/2445; F16H 2025/204; F16H 25/2003
See application file for complete search history.

(56) References Cited

U.S. PATENT DOCUMENTS

| | | | | |
|---|---|---|---|---|
| 3,974,706 A | * | 8/1976 | Danko, Jr. | ............... F16H 25/24 74/89.32 |
| 3,977,262 A | * | 8/1976 | Randolph | ................ B41J 19/20 74/89.36 |
| 4,489,248 A | * | 12/1984 | Petersen | .................. F16H 25/20 310/76 |

(Continued)

FOREIGN PATENT DOCUMENTS

| CN | 102062186 | 5/2011 |
|---|---|---|
| CN | 106533114 | 3/2017 |

(Continued)

OTHER PUBLICATIONS

"Office Action of China Counterpart Application" with English translation thereof, dated Dec. 15, 2020, p. 1-p. 18.

*Primary Examiner* — Howard J Sanders
*Assistant Examiner* — Gregory T Prather
(74) *Attorney, Agent, or Firm* — JCIPRNET

(57) ABSTRACT

A linear drive device includes an output shaft having a first spiral groove, a movable body engaged with the first spiral groove so as to move in an axial direction, a first fixed shaft extending along an axial line, and a second fixed shaft extending around the axial line. The movable body includes a moved member engaging with the first spiral groove, and a slider moving in the axial line direction integrally with a moved member. The slider is provided with guide holes in which the first fixed shaft penetrates, a penetration part in which the second fixed shaft penetrates with play in the direction in which the first and second fixed shafts are connected, and a first and second receiving part for receiving a moved member when the moved member was rotated to one side along the axial line and when the moved member rotated to the other side.

11 Claims, 11 Drawing Sheets

(56) References Cited

U.S. PATENT DOCUMENTS

| | | | | |
|---|---|---|---|---|
| 4,495,871 | A * | 1/1985 | Nagata | B23D 47/005 |
| | | | | 108/143 |
| 5,046,402 | A * | 9/1991 | Lagace | F16H 25/20 |
| | | | | 92/33 |
| 5,234,386 | A * | 8/1993 | Nagai | B23Q 1/56 |
| | | | | 474/148 |
| 5,329,825 | A * | 7/1994 | Askins | B23Q 5/408 |
| | | | | 108/143 |
| 5,611,522 | A * | 3/1997 | Zaguroli, Jr. | B66D 3/18 |
| | | | | 254/323 |
| 6,408,706 | B1 * | 6/2002 | Nagai | F16H 25/20 |
| | | | | 74/89.33 |
| 7,706,083 | B2 * | 4/2010 | Saito | G02B 7/023 |
| | | | | 359/694 |
| 9,509,203 | B1 | 11/2016 | Lee | |
| 9,680,362 | B2 | 6/2017 | Lee | |
| 10,487,873 | B2 | 11/2019 | Nakayama et al. | |
| 2002/0194783 | A1 * | 12/2002 | Stojc | F16H 25/24 |
| | | | | 49/118 |
| 2003/0192388 | A1 * | 10/2003 | Nagai | F16H 57/0497 |
| | | | | 74/89.44 |
| 2005/0011291 | A1 * | 1/2005 | Nagai | F16H 25/20 |
| | | | | 74/89.32 |
| 2006/0102697 | A1 * | 5/2006 | Nagai | H02K 7/06 |
| | | | | 228/101 |
| 2009/0151488 | A1 * | 6/2009 | Wang | A47C 20/041 |
| | | | | 74/89.32 |
| 2011/0113955 | A1 * | 5/2011 | Fukano | H02K 7/116 |
| | | | | 92/172 |
| 2012/0227528 | A1 * | 9/2012 | Brinker | B01F 7/161 |
| | | | | 74/424.71 |
| 2013/0160584 | A1 * | 6/2013 | Li | F16H 25/186 |
| | | | | 74/89.33 |
| 2013/0319146 | A1 * | 12/2013 | Lee | F16H 25/20 |
| | | | | 74/89.23 |
| 2015/0059503 | A1 * | 3/2015 | Baric | B23Q 1/035 |
| | | | | 74/89.32 |
| 2015/0204428 | A1 * | 7/2015 | Chang | F16H 25/24 |
| | | | | 74/89.32 |
| 2019/0008600 | A1 * | 1/2019 | Pedros | A61B 34/30 |
| 2019/0316661 | A1 * | 10/2019 | Parker | F16H 25/24 |
| 2019/0346028 | A1 | 11/2019 | Ohkawa et al. | |
| 2019/0390750 | A1 * | 12/2019 | Huang | F16H 25/2003 |
| 2020/0040972 | A1 * | 2/2020 | Huang | F16H 25/24 |
| 2020/0056685 | A1 * | 2/2020 | Riehle | F16H 25/20 |
| 2020/0141474 | A1 * | 5/2020 | Lim | F16H 25/2204 |
| 2021/0061340 | A1 * | 3/2021 | Wilkes | B62D 1/183 |

FOREIGN PATENT DOCUMENTS

| | | |
|---|---|---|
| CN | 106687701 | 5/2017 |
| GB | 143257 | 11/1920 |
| JP | 2001215395 | 8/2001 |
| JP | 2018014826 | 1/2018 |
| WO | 2018084312 | 5/2018 |

* cited by examiner

LINEAR DRIVE DEVICE

CROSS-REFERENCE TO RELATED APPLICATION

This application claims the priority benefit of Japan application serial no. 2018-104346, filed on May 31, 2018. The entirety of the above-mentioned patent application is hereby incorporated by reference herein and made a part of this specification.

BACKGROUND

Field of the Invention

At least an embodiment of the present invention relates to a linear drive device in which a movable body is engaged with a spiral groove formed on an outer peripheral face of an output shaft of a motor to drive the movable body linearly.

In the linear drive device in which a movable body is engaged to a spiral groove formed on an outer peripheral face of an output shaft to drive the movable body linearly, it is necessary to provide a co-rotation preventing mechanism for preventing the movable body from co-rotating with the output shaft. In constructing such a co-rotation preventing mechanism, for example, in a frame which was fixed to a stator, a mode in which a nut member (movable body) abuts against a base (connection part) connecting a shaft support part with a motor attachment part to prevent the nut member from co-rotating with the output shaft has been proposed (refer to Japanese Unexamined Patent Application No. 2018-14826. Hereinafter, referred to as Patent Literature 1). Further, a mode in which a guide shaft extending parallel to a lead screw (the output shaft) is provided, while an operating means (movable body) provided with the nut which is engaged with the lead screw is engaged with the guide shaft to prevent the co-rotation of the operating means has also been proposed (refer to Japanese Unexamined Patent Application No. 2001-215395. Hereinafter, referred to as Patent Literature 2).

However, in the linear drive device described in Patent Literature 1, the smooth movement of the movable body may be hindered due to the influence of a clearance and the like between the connection part of the movable body and the frame. On the one hand, in the linear drive device described in Patent Literature 2, there is the problem that when the relative positional accuracy between the lead screw and the guide shaft is low, it is not possible to move the operating means smoothly.

In view of the problem described above, the problem of at least an embodiment of the present invention provides a linear drive device capable of linearly moving a movable body smoothly with a relatively simple structure.

SUMMARY

In order to solve the aforementioned problem, the linear drive device according to at least an embodiment of the present invention comprises a motor main body comprising a stator and a rotor, an output shaft structured to have a first spiral groove formed on an outer peripheral face and to which the rotation of the rotor is transmitted and rotated around an axial line, a movable body engaged with the first spiral groove and driven in the axial direction, a first fixed shaft structured to guide extending around the axial line, and a second fixed shaft structured to prevent co-rotation extending along the axial line, wherein the movable body comprises a moved member engaged with the first spiral groove to move along the axial line, and a slider which moves integrally in the axial direction while in contact with the moved member, and wherein the slider comprises with guide holes in which the first fixed shaft penetrates, a penetration part in which the second fixed shaft penetrates with play in the direction in which the first fixed shaft is connected with the second fixed shaft, a first receiving part which receives a first portion of the moved member when the moved member was rotated to one side around the axial line, and a second receiving part which receives a second portion of the moved member when the moved member was rotated to the other side around the axial line.

In at least an embodiment of the present invention, when the output shaft rotates, the moved member engaging with the first spiral groove moves linearly around the axial line of the output shaft in the movable body, and the slider moves linearly together with the moved member while being guided by the first fixed shaft. Here, the second fixed shaft penetrates the slider, thus, the slider is prevented from rotating around the first fixed shaft. Therefore, even when the output shaft rotates to one side around the axial line so as to rotate the moved member with the output shaft, the first receiving part of the slider abuts against the first portion of the moved member to prevent co-rotation, and even when the output shaft rotates to the other side around the axial line so as to rotate the moved member with the output shaft, the second receiving part of the slider abuts against the second portion of the moved member to prevent co-rotation. Namely, unlike the configuration in which the connection part of the frame and the guide shaft are used to prevent the co-rotation of the movable body, two fixed shafts (the first fixed shaft and the second fixed shaft) in parallel with an output member are used to prevent the co-rotation of the movable body. Further, play is provided between the second fixed shaft and the penetration part of the slider, thus, the slider moves smoothly even if the position of the second fixed shaft is displaced relative to the first fixed shaft.

At least an embodiment of the present invention may adopt a mode comprising a frame fixed to the motor main body, wherein the frame is comprised of a support part which supports the output shaft, the first fixed shaft and the second fixed shaft in a position spaced apart from the stator in the axial direction, and the connection part extending from the support part toward the stator. According to this mode, by providing a frame fixed to the motor main body, the support and the fixing of the output shaft, the first fixed shaft and the second fixed shaft can be performed, thus, the linear drive device can be constituted by a motor with a frame.

At least an embodiment of the present invention may adopt a mode in which the frame is comprised of a fixed part fixed to the end face facing the support part of the motor main body, wherein the first fixed shaft and the second fixed shaft are supported by the support part and the fixed part.

According to this mode, when assembling the linear drive device, it is possible to attach the first fixed shaft and the second fixed shaft to the frame in advance, thus, the linear drive device can be assembled more efficiently.

At least an embodiment of the present invention may adopt a mode in which at least one of the first portion and the first receiving part is a curved surface which, when the moved member was rotated to one side around the axial line, makes the contact between the first portion and the first receiving part as a line contact or a point contact. Furthermore, a mode may be adopted in which at least one of the second portion and the second receiving part is a curved surface which, when the moved member was rotated to the other side around the axial line makes the contact between the second portion and the second receiving part as a line contact or a point contact. According to this mode, the clearance between the moved member and the slider hardly fluctuate greatly even if the angular position around the axial line of the moved member is displaced due to the influence such as a decrease of the relative positional accuracy between the output shaft and the first fixed shaft.

At least an embodiment of the present invention may adopt a mode in which the moved member is comprised of a protruded part protruding in the direction intersecting the axial line and fitted on the inside of the recessed part formed in the slider, wherein the first portion is constituted by the portion positioned on one side around the axial line of the protruded part, the second portion is constituted by the portion positioned on the other side around the axial line of the protruded part, the first receiving part is constituted by a wall surface positioned on one side around the axial line of the recessed part, and the second receiving part is constituted by a wall surface positioned on the other side around the axial line of the recessed part.

At least of an embodiment of the present invention may adopt a mode in which the output shaft is provided between the first fixed shaft and the second fixed shaft when viewed from the axial direction.

At least an embodiment of the present invention may adopt a mode in which the output shaft is a motor shaft connected to the rotor to be integrally rotated with the rotor.

At least an embodiment of the present invention may adopt a mode in which the moved member is a nut member in which a second spiral groove which engages with a first spiral groove is formed on the inner peripheral face of a shaft hole through which the output shaft penetrates.

At least an embodiment of the present invention may adopt a mode in which an elastic member is provided in a portion interposed around the axial line by the moved member and the slider.

At least an embodiment of the present invention may adopt a mode in which the elastic member is provided in a portion interposed in the axial direction by the moved member and the slider.

In at least an embodiment of the present invention, when the output shaft rotates, the moved member engaging with the first spiral groove moves linearly around the axial line of the output shaft in the movable body, and the slider moves linearly together with the moved member while being guided by the first fixed shaft. Here, the second fixed shaft penetrates the slider, thus, the slider prevents the rotation around the first fixed shaft. Therefore, even when the output shaft rotates to one side around the axial line so as to rotate the moved member with the output shaft, the first receiving part of the slider abuts against the first portion of the moved member to prevent co-rotation, and even when the output shaft rotates to the other side around the axial line so as to rotate the moved member with the output shaft, the second receiving part of the slider abuts against the second portion of the moved member to prevent co-rotation. Namely, unlike the configuration in which the connection part of the frame and the guide shaft are used to prevent the co-rotation of the movable body, the two fixed shafts (the first fixed shaft and the second fixed shaft) in parallel with an output member are used to prevent the co-rotation of the movable body. Further, play is provided between the second fixed shaft and the penetration part of the slider, thus, the slider can move smoothly even if the position of the second fixed shaft is displaced relative to the first fixed shaft.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An example of the linear drive device used in at least an embodiment of the present invention will be described with reference to the drawings. Note that, in the following description, the axial line of the output shaft 40 is indicated by L, the side where an output shaft 40 protrudes from a motor main body 10 of the axial line L direction is indicated as an output side La, and the side opposite to an output side La is indicated as an opposite-to-output side Lb. Further, the direction orthogonal to the axial line L will be indicated as the first direction X and the direction orthogonal to both the axial line L direction and the first direction X will be indicated as a second direction Y. Further, X1 indicates one side of the first direction X, X2 indicates the other side of the first direction X, Y1 indicates one side of the second direction Y, and Y2 indicates the other side of the second direction Y.

(Entire Configuration)

Figure 1:
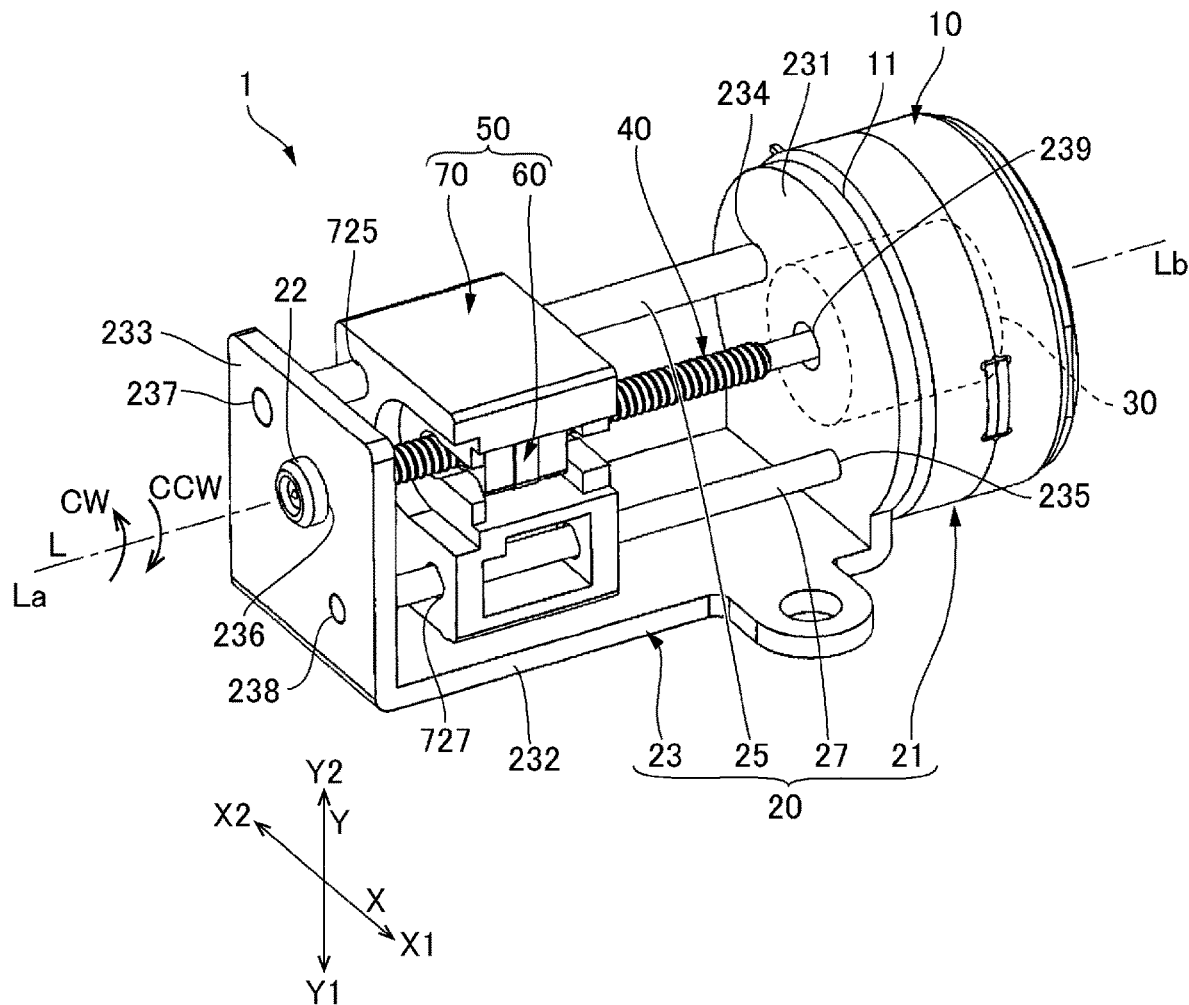
FIG. 1 is a perspective view illustrating a linear drive device used in at least an embodiment of the present invention when seen from the output side.
Figure 2:
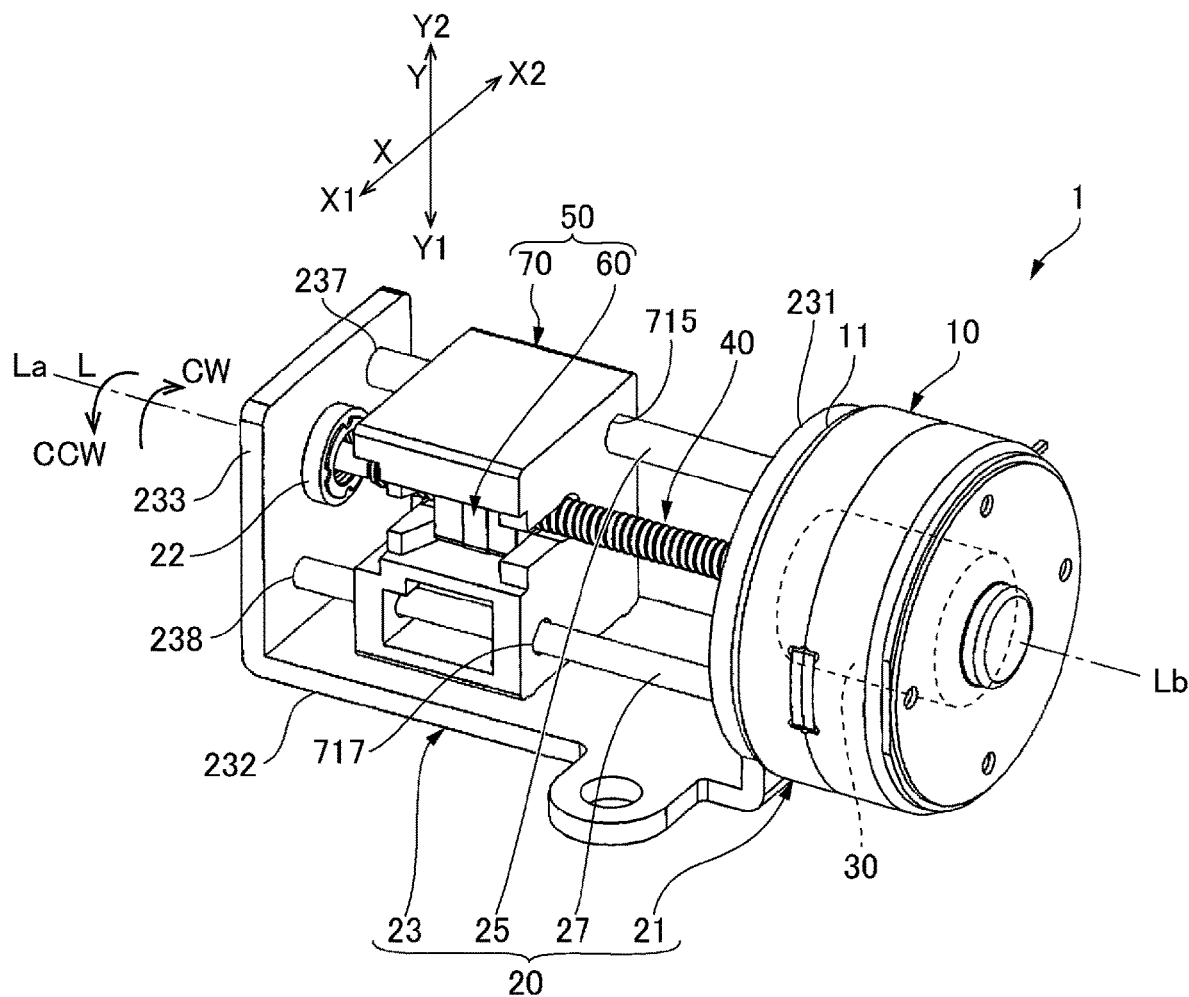
FIG. 2 is a perspective view illustrating the linear drive device shown in FIG. 1 when viewed from an opposite-to-output side.
Figure 3:
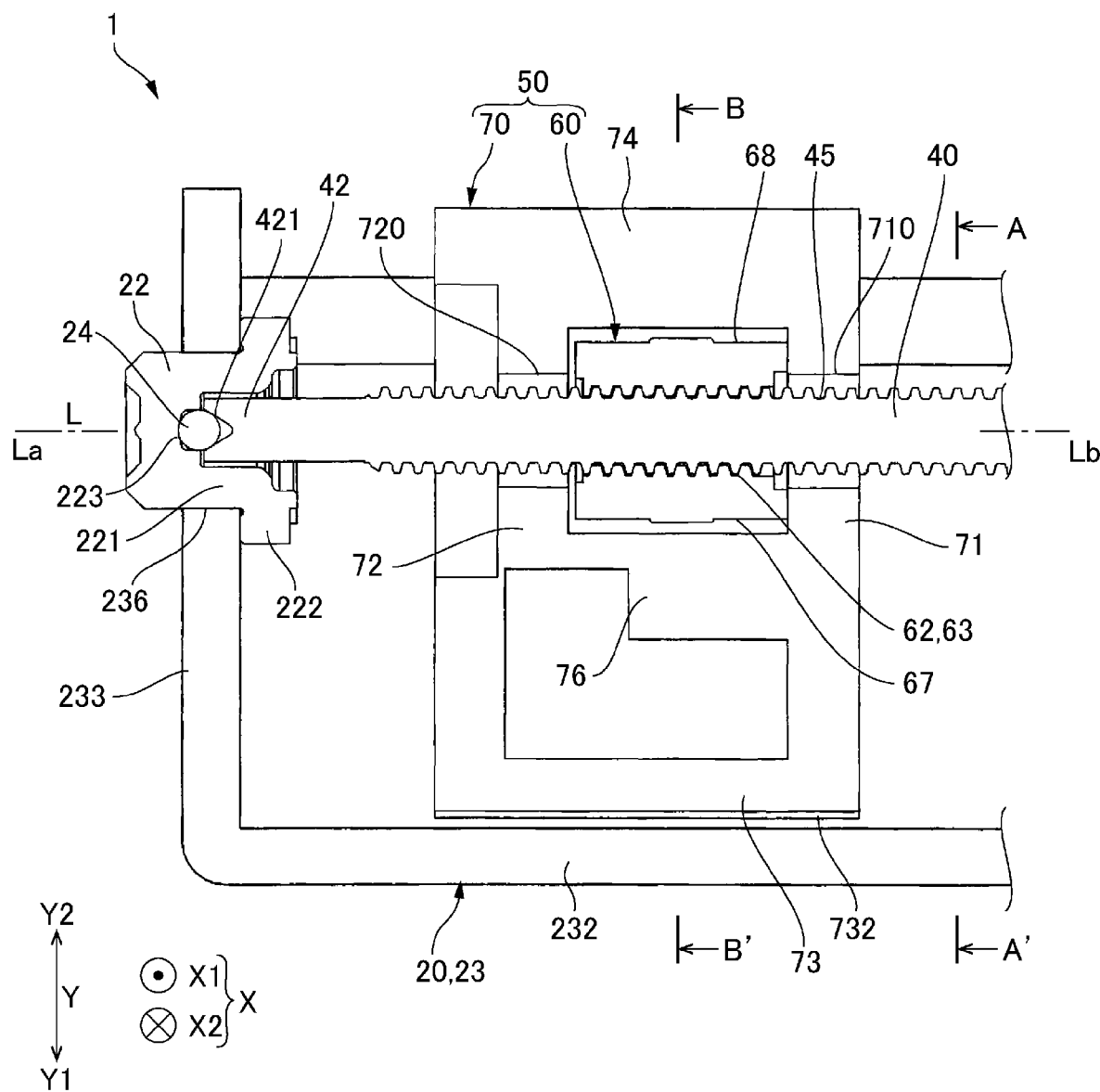
FIG. 3 is an explanatory view illustrating an enlarged section along the axial line of the movable body and the like shown in FIG. 1.

FIG. 1 is a perspective view illustrating a linear drive device 1 used in at least an embodiment of the present invention when viewed from the output side La. FIG. 2 is a perspective view when the linear drive device 1 shown in FIG. 1 is viewed from the opposite-to-output side Lb. FIG. 3 is an explanatory view illustrating an enlarged section along the axial line L of a movable body 50 and the like shown in FIG. 1.

The linear drive device 1 shown in FIG. 1, FIG. 2 and FIG. 3 is comprised of the motor main body 10 comprising a stator 21 and the rotor 30, the output shaft 40 structured to have a first spiral groove 45 formed on an outer peripheral face, and the movable body 50 engaged with the first spiral groove 45 to be driven in the axial line L direction. The output shaft 40 transmits the rotation of the rotor 30 and rotates around the axial line L. In the present embodiment, the output shaft 40 is a motor shaft connected to the rotor 30 to be integrally rotated with the rotor 30. Further, in the present example, the motor main body 10 used a stepping motor.

In the linear drive device 1, the stator 21 is constituted by a first fixed shaft 25 for guiding extending along the axial line L, a second fixed shaft 27 for preventing co-rotation extending along the axial line L, and a fixed body 20. Further, the fixed body 20 is comprised of a frame 23 fixed on the motor main body 10, wherein the frame 23 is comprised of a support part 233 which supports the output shaft 40, the first fixed shaft 25, and the second fixed shaft 27 in a position separated from the motor main body 10 in the output side La of the axial line L direction, and a connection part 232 extending from the support part 233 toward a motor main body 10. Further, the frame 23 is provided with a fixed part 231 fixed to an end face 11 facing the support part 233 of the motor main body 10 in a direction of welding or the like, and both end parts of each of the first fixed shaft 25 and the second fixed shaft 27 are respectively supported by holes 237 and 238 formed in the support part 233, and holes 234 and 235 formed in the fixed part 231.

In the frame 23, a through hole 239 is formed in the fixed part 231, and the output shaft 40 protrudes from the motor main body 10 through the through hole 239 to a position between the fixed part 231 and the support part 233. Further, a bearing holding hole 236 is formed in the support part 233, and a bearing 22 is supported in the bearing holding hole 236. The bearing 22 contains a bottomed tube part 221 and a flange part 222 which is enlarged in diameter at the end part of the tube part 221, and the flange part 222 overlaps the surface of the opposite-to-output side Lb of the support part 233.

As shown in FIG. 3, a steel ball 24 is disposed inside of the tube part 221, and the steel ball 24 rotatably supports the output shaft 40 between the recessed part 223 formed in the bottom of the tube part 221 and the recessed part 421 formed in a tip end part 42 of the output shaft 40.

(Structure of the First Fixed Shaft 25 and the Second Fixed Shaft 27)

Figure 4:
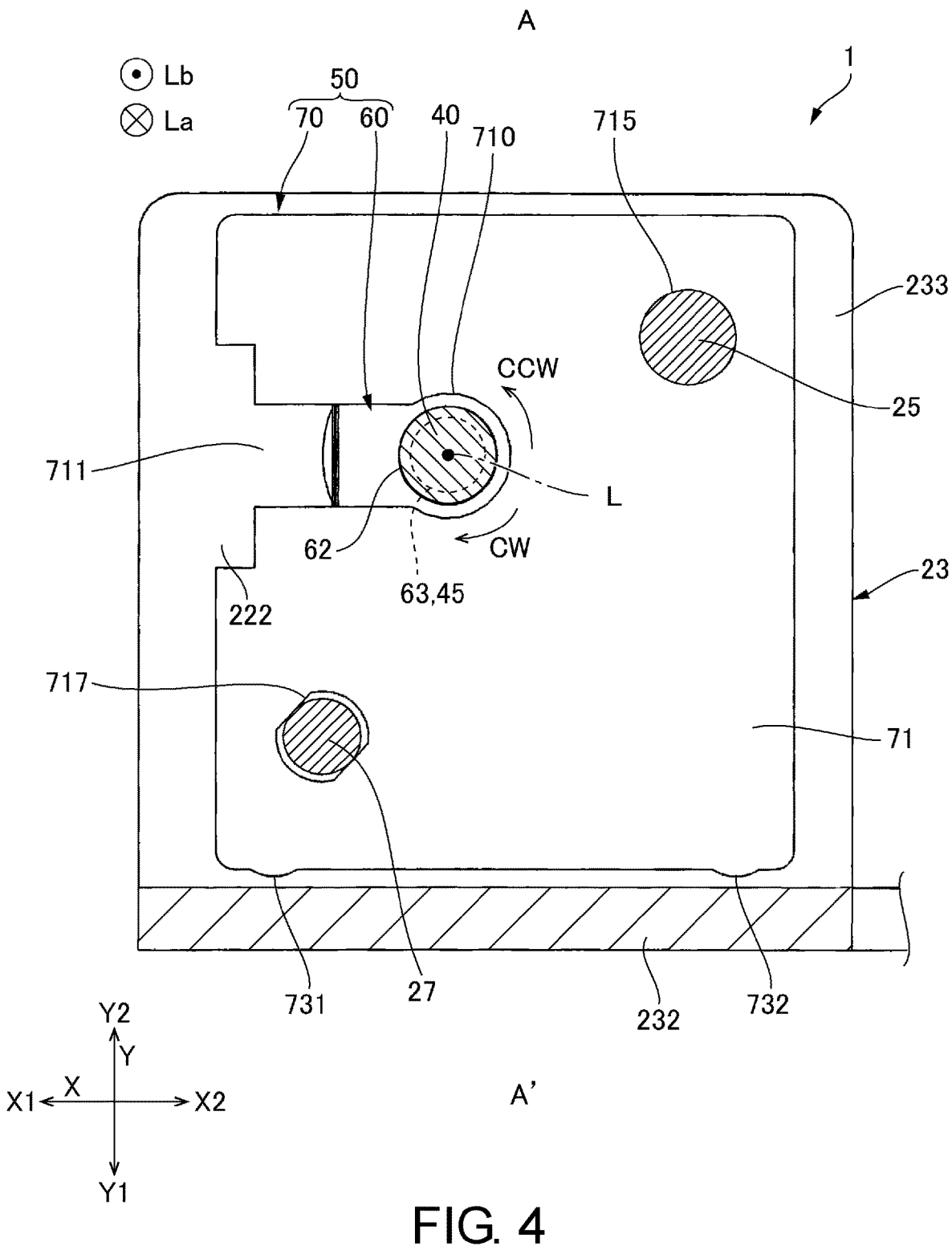
FIG. 4 is a cross-sectional view illustrating the linear drive device shown in FIG. 1 taken along A-A' line of FIG. 3.
Figure 5:
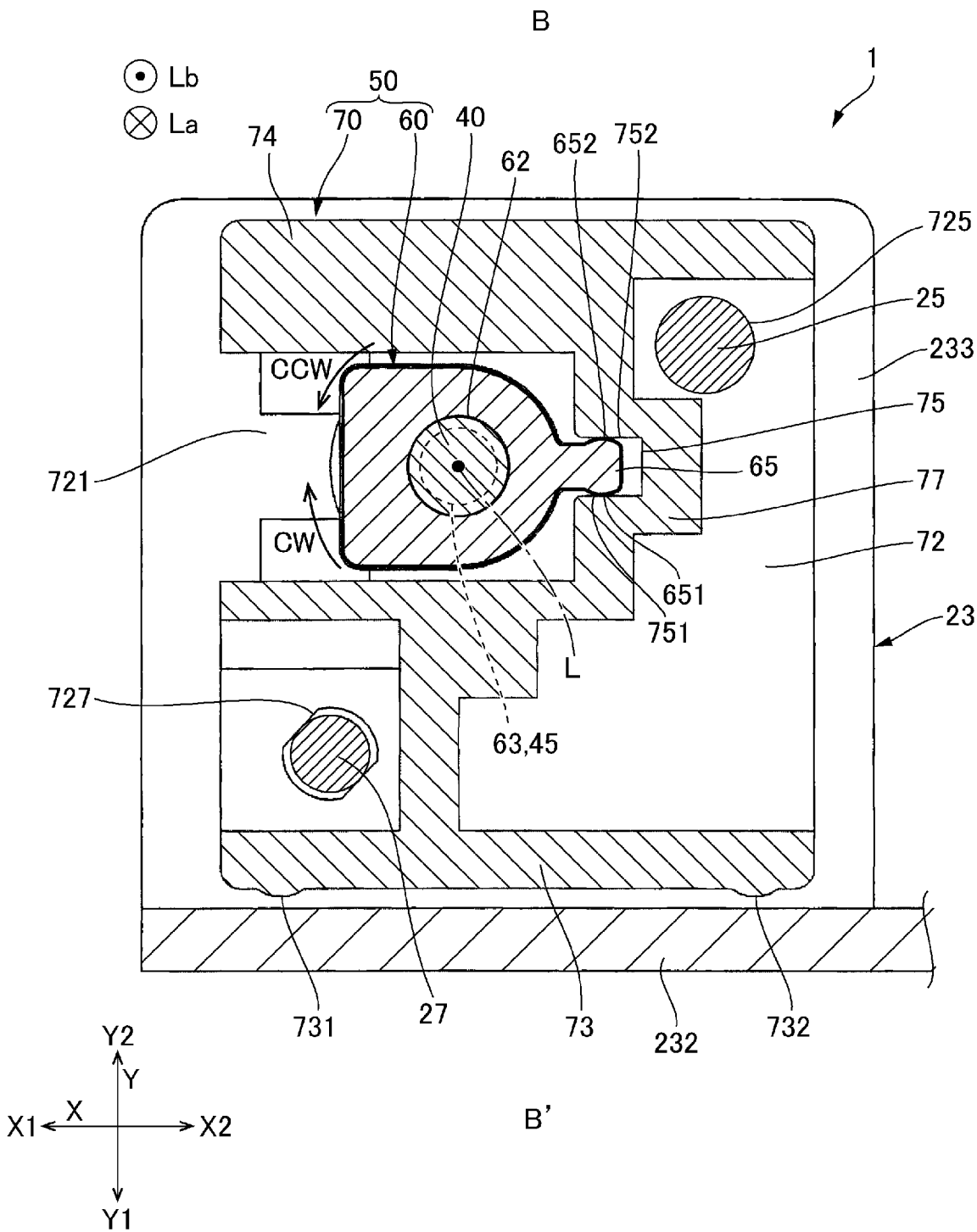
FIG. 5 is a cross-sectional view illustrating the linear drive device shown in FIG. 1 taken along B-B' line of FIG. 3.

FIG. 4 is a cross-sectional view illustrating the linear drive device 1 shown in FIG. 1 taken along A-A' line of FIG. 3. FIG. 5 is a cross-sectional view illustrating the linear drive device 1 shown in FIG. 1 taken along B-B' line of FIG. 3. Note that, in FIG. 4 and FIG. 5, an engaging portion between the first spiral groove 45 of the output shaft 40 and a second spiral groove 63 of a moved member 60 is schematically shown by a simple circle.

As shown in FIG. 1 and FIG. 2, the first fixed shaft 25 is for guiding when moving the movable body 50 in the axial line L direction, and is made of a round bar. The second fixed shaft 27 is for preventing co-rotation wherein the movable body 50 is prevented from co-rotating with the output shaft 40, and is made of a round bar.

As shown in FIG. 4 and FIG. 5, when viewed from the axial line L direction, the output shaft 40 is disposed between the first fixed shaft 25 and the second fixed shaft 27. More specifically, when viewed from the axial line L direction, the movable body 50 is a rectangle, and the first fixed shaft 25 and the second fixed shaft 27 are respectively disposed in the vicinity of the two corners positioned at the diagonals of the rectangle, while the output shaft 40 is disposed in the vicinity of the center of the diagonal line connecting the aforementioned two corners.

(Structure of Moved Member 60 of Movable Body 50)

Figure 6:
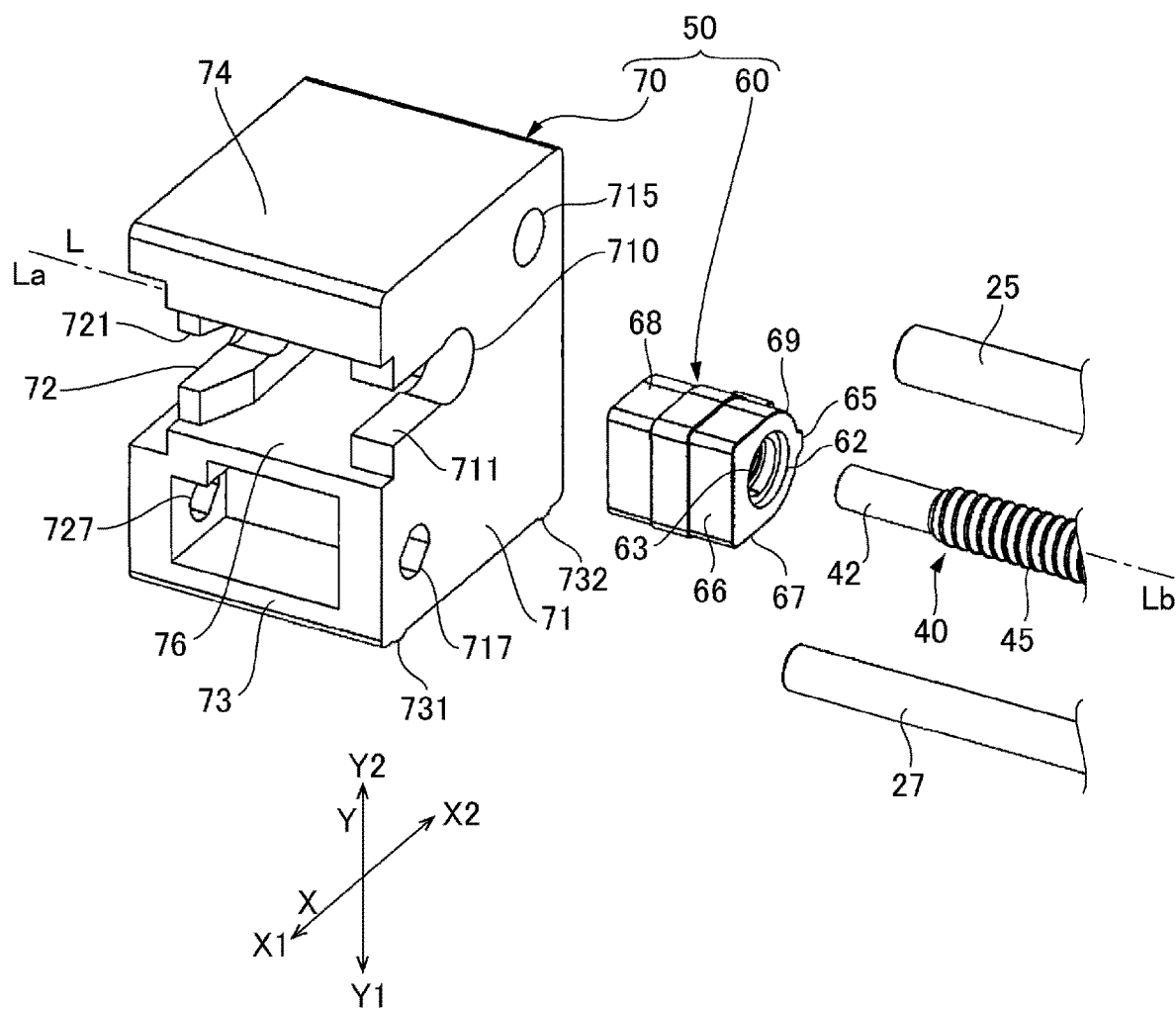
FIG. 6 is an exploded perspective view illustrating the movable body and the like shown in FIG. 1.
Figure 7:
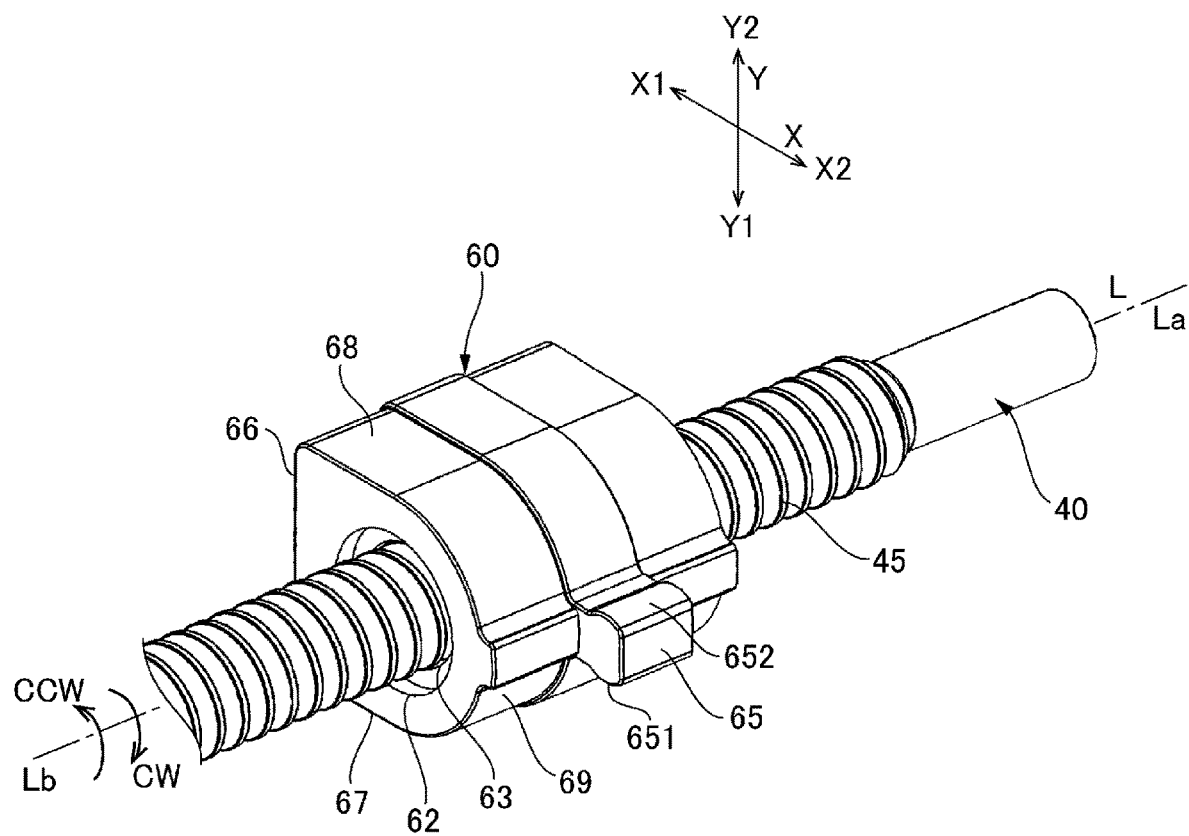
FIG. 7 is a perspective view illustrating the movable body and the like shown in FIG. 4.

FIG. 6 is an exploded perspective view illustrating the movable body 50 and the like shown in FIG. 1. FIG. 7 is a perspective view illustrating the moved member 60 and the like shown in FIG. 4. As shown in FIG. 1, FIG. 2 and FIG. 3, the movable body 50 is disposed between the fixed part 231 and the support part 233 of the frame 23. As shown in FIG. 6, the movable body 50 is comprised of a moved member 60 engaged with the first spiral groove 45 of the output shaft 40 to move along the axial line L, and a slider 70 moving in the axial line L direction integral with the moved member 60.

As shown in FIG. 7, the moved member 60 is a nut member in which the second spiral groove 63 which engages the first spiral groove 45 of the output shaft 40 is formed on the inner peripheral face of the shaft hole 62 through which the output shaft 40 penetrates. In the present embodiment, the moved member 60, when viewed from the axial line L direction, contains a bottom face 66 of one side X1 of the first direction X, a side surface 67 extending from the edge of one side Y1 of the second direction Y of the bottom face 66 toward the other side X2 of the first direction X, and a side surface 68 extending from the edge of the other side Y2 of the second direction Y of the bottom face 66 toward the other side X2 of the first direction X, the end part of the other side X2 of the first direction X of the side surface 67 and the end part of the other side X2 of the first direction X of the side surface 68 has a convex curved surface 69 which bulges toward the other side X2 of the first direction X.

Further, the moved member 60 has a protruded part 65 which protrudes from the center of the second direction Y of the convex curved surface 69 to the other side X2 of the first direction X. The side surface of one side CW around the axial line L of the protruded part 65 is a first portion 651 which is in contact with a first receiving part 751 of the slider 70 when the moved member 60 rotated to one side CW side around the axial line L, as described later. The side surface of the other side CCW around the axial line L of the protruded part 65 is a second portion 652 which is in contact with a second receiving part 752 of the slider 70 when the moved member 60 rotated to the other side CCW side around the axial line L, as described later.

(Structure of the Slider 70)

Figure 8:
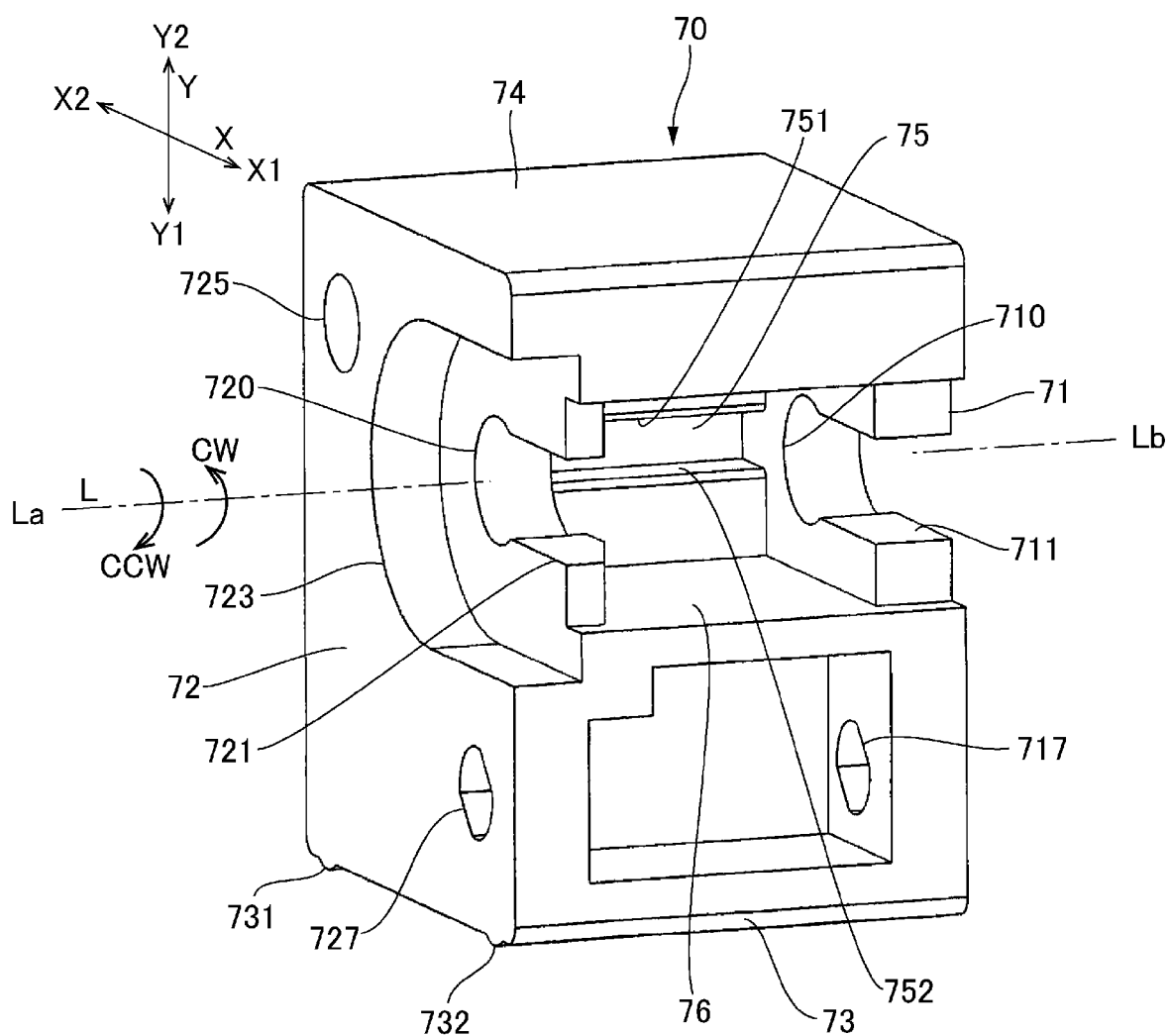
FIG. 8 is a perspective view illustrating the slider shown in FIG. 4 viewed from the one side X1 of a first direction X.
Figure 9:
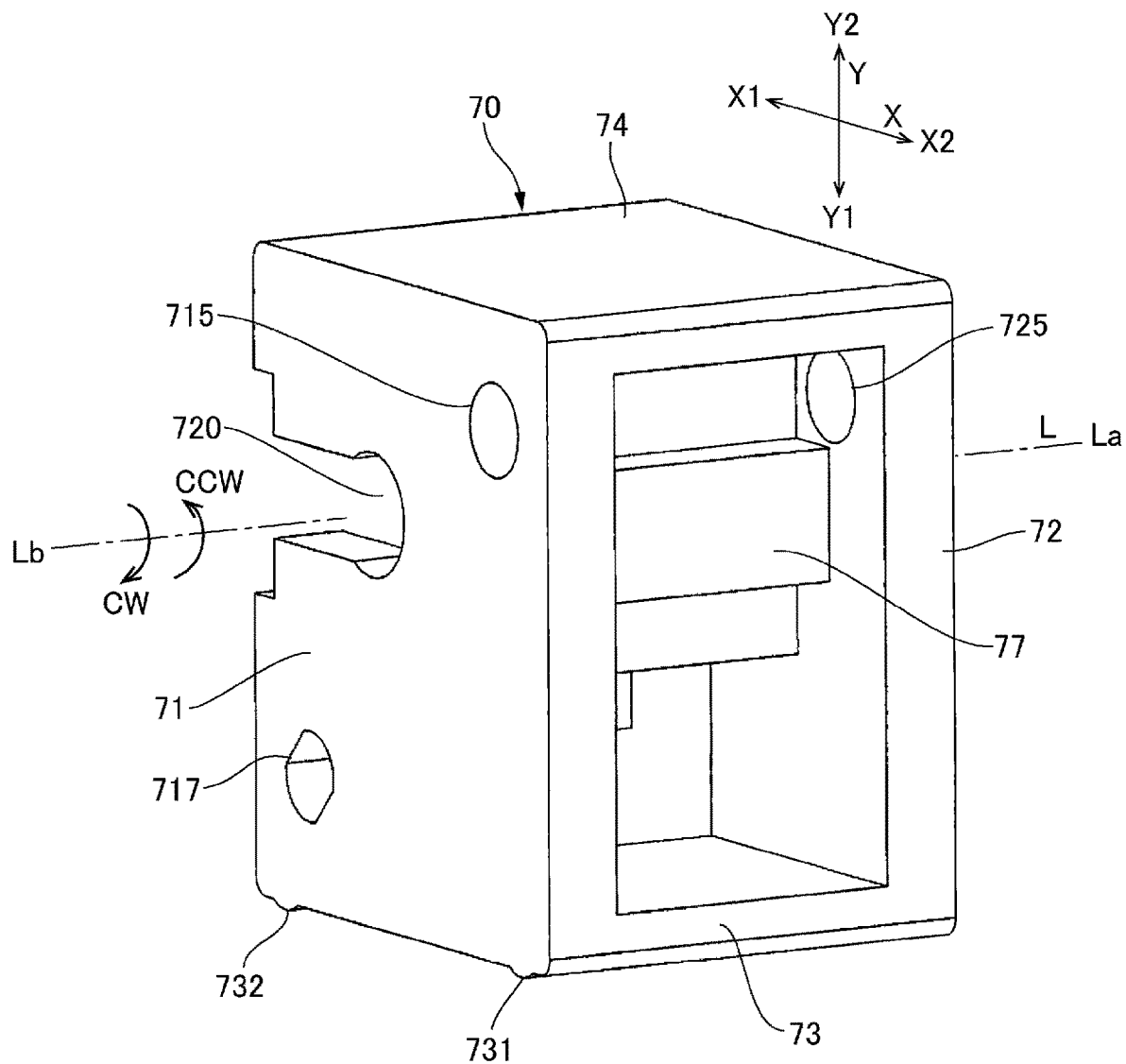
FIG. 9 is a perspective view illustrating the slider shown in FIG. 4 viewed from the other side X2 of the first direction X.

FIG. 8 is a perspective view illustrating the slider 70 shown in FIG. 4 viewed from one side X1 of the first direction X. FIG. 9 is a perspective view illustrating the slider 70 shown in FIG. 4 viewed from the other side X2 of the first direction X.

As shown in FIG. 8 and FIG. 9, the slider 70 is comprised of a first plate part 71 positioned on the opposite-to-output side Lb, a second plate part 72 positioned on the output side La, a third plate part 73 connecting with the first plate part 71 and the second plate part 72 at one side Y1 of the second direction Y, a fourth plate part 74 connecting with the first plate part 71 and the second plate part 72 at the other side Y2 of the second direction Y, and a fifth plate part 76 connecting with the first plate part 71 and the second plate part 72 between the third plate part 73 and the fourth plate part 74. Protruded parts 731 and 732 which protrude toward the connection part 232 of the frame 23 in the position separated in the first direction X are provided in the third plate part 73. However, the slider 70 is not in contact with the connection part 232 of the frame 23.

The space surrounded by the first plate part 71, the second plate part 72, the fourth plate part 74, and the fifth plate part 76 is partitioned into the space of one side X1 of the first direction X and the space of the other side X2 by a partition wall 77. The moved member 60 is disposed in a space of one side X1 among the spaces partitioned by the partition wall 77 in the first direction X. In this state, the moved member 60 is disposed between the first plate part 71 and the second plate part 72 in the axial line L direction. Therefore, when the moved member 60 moved to the axial line L direction, the slider 70 moves in the axial line L direction in a state which contacts with the moved member 60. For example, as shown in FIG. 3, when the moved member 60 moved to the opposite-to-output side Lb, the end part of the opposite-to-output side Lb of the moved member 60 is in contact with the first plate part 71 of the slider 70, thus, the slider 70 moves to the opposite-to-output side Lb of the axial line L direction.

Cut-outs 710 and 720 through which the output shaft 40 passes are respectively formed in the first plate part 71 and the second plate part 72. In the present embodiment, the cut-outs 710 and 720 are shaped to have open ends on one side X1 of the first direction X. The width of open ends 711 and 721 on one side X1 of the first direction X of the cut-outs 710 and 720 is wider than the outer diameter of the output shaft 40.

The face of the output side La of the second plate part 72 is a recessed part 723 around the cut-out 720. Therefore, when the slider 70 moved to the output side La, the bearing 22 enters into the recessed part 723, thus, the bearing 22 does not hinder the movement of the slider 70. Therefore, the stroke is set to be longer.

As shown in FIG. 5, a recessed part 75 recessed on the other side X2 of the first direction X is formed in the partition wall 77, thus, the protruded part 65 of the moved member 60 is fitted on the inside of the recessed part 75. Therefore, the wall surface of the inner wall of the recessed part 75 positioned to one side CW around the axial line L is the first receiving part 751 for receiving the first portion 651 of the protruded part 65 when the moved member 60 rotated to the one side CW side around the axial line L, and the wall surface positioned on the other side CCW around the axial line L is the second receiving part 752 for receiving the second portion 652 of the protruded part 65, when the moved member 60 rotated to the other side CCW side around the axial line L. In the present embodiment, when assembling the linear drive device 1, the protruded part 65 of the moved member 60 is fitted on the inside of the recessed part 75 of the slider 70, the first portion 651 of the protruded part 65 is in contact with the first receiving part 751 of the recessed part 75, and the second portion 652 of the protruded part 65 is in contact with the second receiving part 752 of the recessed part 75. Therefore, due to the contact between the recessed part 75 and the protruded part 65, it is possible to prevent the moved member 60 from idling against the slider 70.

At least one of the first portion 651 of the moved member 60 and the first receiving part 751 of the slider 70 is a curved surface, which, when the moved member 60 rotated to one side CW around the axial line L, makes the contact between the first portion 651 and the first receiving part 751 as a line contact or a point contact. In the present embodiment, the first portion 651 of the moved member 60 was made to a curved surface, while the first receiving part 751 is a receiving surface. In the present embodiment, the first receiving part 751 is a planar surface, while the first portion 651 is a convex curved surface which bulges toward the first receiving part 751, thus, the first portion 651 and the first receiving part 751 are in contact with a line extending in the axial line L direction.

Further, at least one of the second portion 652 of the moved member 60 and the second receiving part 752 of the slider 70 is a curved surface which, when the moved member 60 rotated to the other side CCW around the axial line L, makes the contact between the second portion 652 and the second receiving part 752 as a line contact or a point contact. In the present embodiment, the second portion 652 of the moved member 60 was made to a curved surface, while the second receiving part 752 is a receiving surface. In the present embodiment, the second receiving part 752 is a planar surface, while the second portion 652 is a convex curved surface which bulges toward the second receiving part 752, thus, the second portion 652 and the second receiving part 752 are in contact with a line extending in the axial line L direction.

Guide holes 715 and 725 in which the first fixed shaft 25 penetrates and a penetration parts 717 and 727 in which the second fixed shaft 27 penetrates with play in the direction in which the first fixed shaft 25 is connected with the second fixed shaft 27 are formed in the first plate part 71 and the second plate part 72. More specifically, the first fixed shaft 25 is a round bar shape having a circular cross section, while the guide holes 715 and 725 are circular holes substantially equal to the outer diameter of the first fixed shaft 25. The second fixed shaft 27 is a round bar shape having a circular cross section. With respect thereto, the penetration parts 717 and 727 are elliptical holes whose major axes are oriented in the diagonal direction where the second fixed shaft 27 is positioned, and the dimension of the minor axis direction is substantially equal to the outer diameter of the second fixed shaft 27.

(Primary Effect of the Present Embodiment)

As described above, in the linear drive device 1 of the present embodiment, when the stator 21 is energized so as to rotate the rotor 30, the output shaft 40 rotates around the axial line L. Therefore, the moved member 60 formed by the second spiral groove 63 engaging with the first spiral groove 45 of the output shaft 40 moves linearly along the axial line L of the output shaft 40 in the movable body 50, and the slider 70 moves linearly together with the moved member 60 while being guided to the first fixed shaft 25. Here, the second fixed shaft 27 penetrates the slider 70, thus, the slider 70 is prevented from rotating along the first fixed shaft 25. Therefore, even when the output shaft 40 rotates to one side CW around the axial line L so as to co-rotate the moved member 60 with the output shaft 40, the first portion 651 of the moved member 60 abuts against the first receiving part 751 of the slider 70 to prevent the co-rotation. Conversely, even when the output shaft 40 rotates to the other side CCW around the axial line L so as to co-rotate the moved member 60 with the output shaft 40, the second portion 652 of the moved member 60 abuts against the second receiving part 752 of the slider 70 to prevent the co-rotation. Namely, unlike the configuration which uses the connection part 232 of the frame 23 and the guide shaft to prevent the co-rotation of the movable body 50, the two fixed shafts (the first fixed shaft 25 and the second fixed shaft 27) are used in parallel with the output member to prevent the co-rotation of the movable body 50.

Here, a play is provided to the penetration parts 717 and 727 between the second fixed shaft 27 and the slider 70, thus, even when the position of the second fixed shaft 27 is displaced relative to the first fixed shaft 25, a large sliding resistance is generated between the slider 70 and the second fixed shaft 27, and accordingly, the slider 70 can be moved smoothly with a relatively simple structure.

Further, the movable body 50 is divided into the moved member 60 and the slider 70, thus, even if a large load is applied from the output shaft 40 to the moved member 60, such a load can be relieved by a clearance between the moved member 60 and the slider 70. Further, even when the relative positional accuracy between the output shaft 40 and the first fixed shaft 25 is low, such a low positional accuracy can be absorbed by the positional relationship between the moved member 60 and the slider 70. Therefore, the slider 70 can be moved smoothly with a relatively simple structure.

Further, in the present embodiment, the support and the fixing of the output shaft 40, the first fixed shaft 25 and the second fixed shaft 27 can be performed by the frame 23 fixed to the motor main body 10. Therefore, the linear drive device 1 can be constituted by a motor with a frame. Further, the first fixed shaft 25 and the second fixed shaft 27 are supported by the support part 233 and the fixed part 231 of the frame 23, thus, when assembling the linear drive device 1, it is possible to attach the first fixed shaft 25 and the second fixed shaft 27 to the frame 23 in advance, and accordingly, the linear drive device can be assembled more efficiently.

Further, by making the first portion 651 and the second portion 652 of the moved member 60 to a convex curved surface (curved surface), the first portion 651 and the first receiving part 751 are in linear contact, and the second portion 652 and the second receiving part 752 are in linear contact. Therefore, even when the moved member 60 is inclined around the axial line L for the purpose of absorbing a low relative positional accuracy between the output shaft 40 and the first fixed shaft 25 by the positional relationship between the moved member 60 and the slider 70, the first portion 651 can be reliably brought into linear contact with the first receiving part 751, and the second portion 652 can be reliably brought into linear contact with the second receiving part 752.

Modified Example 1 of at Least an Embodiment of the Present Invention

Figure 10:
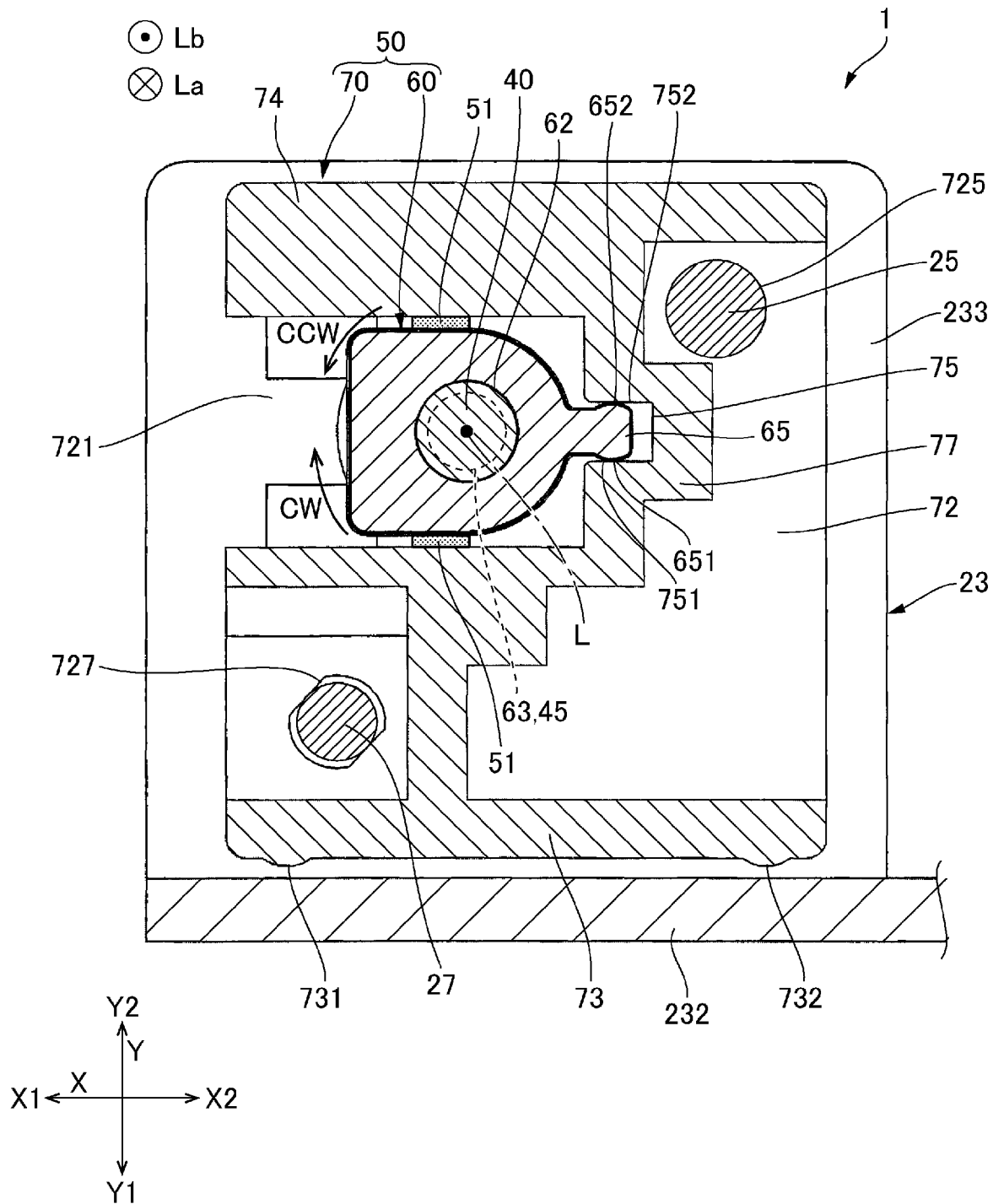
FIG. 10 is an explanatory view illustrating a modified example 1 of the linear drive device used in at least an embodiment of the present invention.

FIG. 10 is an explanatory drawing illustrating a modified example 1 of the linear drive device 1 used in at least an embodiment of the present invention, and corresponds to a cross-sectional drawing of the linear drive device 1 shown in FIG. 1 taken along A-A' line of FIG. 3. Note that, the basic structure of the present example is the same as the embodiments described with reference to FIG. 1 to FIG. 9, thus, the same reference signs are used in common portions and their descriptions are omitted.

As shown in FIG. 10, in the present example, an elastic member 51 such as a flexible sheet is provided in a portion interposed around the axial line L by the moved member 60 and the slider 70. In such a configuration, even when there is a gap between the first receiving part 751 and the second receiving part 752 of the recessed part 75 of the slider 70 and the first portion 651 and the second portion 652 the protruded part 65 of the moved member 60, there is the advantage such as the generation of a collision sound between the moved member 60 and the slider 70 can be suppressed when the moved member 60 was rotated along the axial line L.

Modified Example 2 of the at Least an Embodiment of Present Invention

Figure 11:
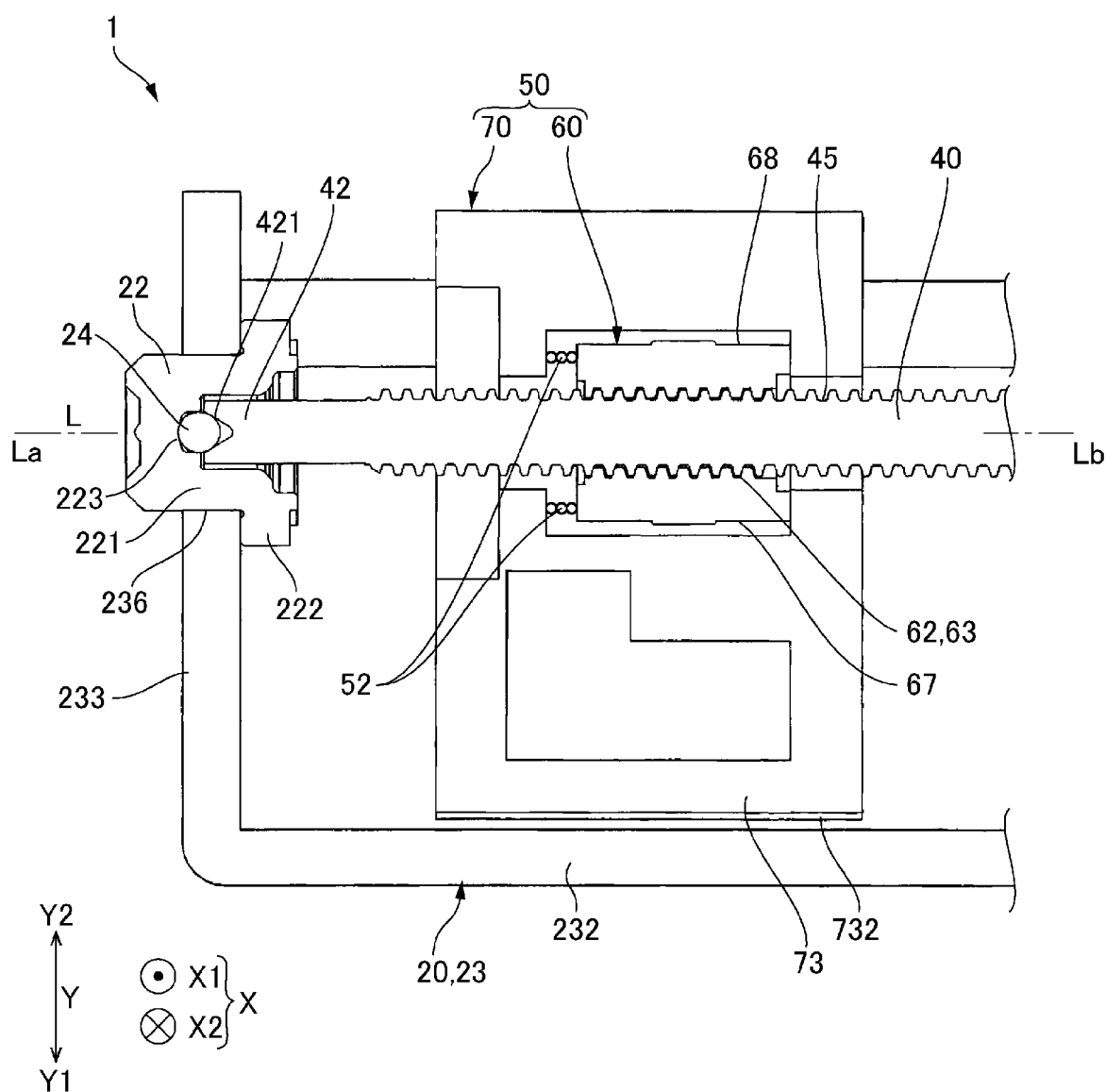
FIG. 11 is an explanatory view illustrating a modified example 2 of the linear drive device used in at least an embodiment of the present invention.

FIG. 11 is an explanatory drawing illustrating a modified example 2 of the linear drive device 1 used in at least an embodiment of the present invention, and corresponds to a cross-sectional view of the linear drive device 1 shown in FIG. 1 taken along the axial line L. Note that, the basic structure of the present example is the same as the embodiments described with reference to FIG. 1 to FIG. 9, thus, the same reference signs are used in common portions and their descriptions are omitted.

As shown in FIG. 11, in the present example, an elastic member 52 such as a coil spring is provided in the portion interposed in the axial line L direction by the moved member 60 and the slider 70. In such a configuration, there is the advantage such as the generation of a collision sound between the moved member 60 and the slider 70 can be suppressed when the slider 70 moves in the axial line L direction following the moved member 60. Further, the elastic member 52 presses the moved member 60 against the slider 70 in the axial line L direction, thus, the state in which the moved member 60 and the slider 70 are in contact with each other in the axial line L direction can be maintained. Therefore, positional errors due to shaking and the like can be easily alleviated.

Other Embodiments

In the aforementioned embodiments, the first portion 651 and the second portion 652 were made as curved surfaces, but the first receiving part 751 and the second receiving part 752 may also be made as convex curved surfaces (curved surfaces). Further, in the aforementioned embodiment, both the contact between the first portion 651 and the first receiving part 751, and the contact between the second portion 652 and the second receiving part 752 were made as a line contact or a point contact, but the contact between the first portion 651 and the first receiving part 751 may be a line contact or a point contact, and the contact between the second portion 652 and the second receiving part 752 may also be a surface contact.

In the aforementioned embodiment, the first fixed shaft 25 and the second fixed shaft 27 are supported on the frame 23, but at least an embodiment of the present invention may also be used when one or both of the first fixed shaft 25 and the second fixed shaft 27 are supported on a member other than the frame 23.

In the aforementioned embodiment, the output shaft 40 was a motor shaft connected to the rotor 30 so as to rotate integrally with the rotor 30, but at least an embodiment of the present invention may also be used when a geared motor which transmits the rotation of the rotor 30 to the output shaft 40 via a gear transmission mechanism was used.

In the aforementioned embodiment, the motor main body 10 was a stepping motor, but at least an embodiment of the present invention may also be used when the motor main body 10 is a motor with a brush and the like.

In the aforementioned embodiment, the penetration parts 717 and 727 were long holes, but may also be groove shaped. Further, in the aforementioned embodiment, the first portion 651 and the second portion 652 of the moved member 60 were formed in the protruded part, and the first receiving part 751 and the second receiving part 752 of the slider 70 were formed in the recessed part, but the first portion 651 and the second portion 652 of the moved member 60 may also be formed in the recessed part, and the first receiving part 751 and the second receiving part 752 of the slider 70 may also be formed in the protruded part.

What is claimed is:

1. A linear drive device comprising:
a motor main body, comprising a stator and a rotor,
an output shaft, structured to have a first spiral groove formed on an outer peripheral face, and to which a rotation of the rotor is transmitted and rotated around an axial line,
a movable body, engaged with the first spiral groove and driven in an axial direction parallel to the axial line,
a first fixed shaft, structured to guide and extending along the axial direction, and
a second fixed shaft, structured to prevent a co-rotation and extending along the axial direction, wherein
the movable body comprises a moved member engaged with the first spiral groove to move along the axial line, and a slider which moves while in contact with the moved member, and
the slider comprises a plurality of guide holes in which the first fixed shaft penetrates, a penetration part in which the second fixed shaft penetrates with a play in a direction in which the first fixed shaft is connected with the second fixed shaft, a first receiving part which receives a first portion of the moved member when the moved member is rotated to one side around the axial line, and a second receiving part which receives a second portion of the moved member when the moved member was rotated to an other side around the axial line,
wherein the penetration part is a long hole with a major axis oriented in a diagonal direction where the second fixed shaft is positioned, and the diagonal direction is the direction in which the first fixed shaft is connected with the second fixed shaft.

2. The linear drive device according to claim 1 comprising,
a frame fixed to the motor main body, wherein
the frame comprising a support part for supporting the output shaft, the first fixed shaft and the second fixed shaft in a position spaced apart from the stator in the axial direction, and a connection part extending from the support part toward the stator.

3. The linear drive device according to claim 2 wherein
the frame comprises a fixed part fixed to an end face facing the support part of the frame, and
the first fixed shaft and the second fixed shaft are supported by the support part and the fixed part.

4. The linear drive device according to claim 1, wherein
at least one of the first portion and the first receiving part is a curved surface which, when the moved member was rotated to one side of the axial line, makes a contact between the first portion and the first receiving part as a line contact or a point contact.

5. The linear drive device according to claim 4 wherein
at least one of the second portion and the second receiving part is a curved surface which, when the moved member was rotated to the other side of the axial line, makes a contact between the second portion and the second receiving part as a line contact or a point contact.

6. The linear drive device according to claim 5, wherein
the moved member comprises a protruded part protruding in a direction intersecting the axial line and fitted on an inside of a recessed part formed in the slider, wherein
the first portion is constituted by a portion positioned on one side around the axial line of the protruded part, the second portion is constituted by a portion positioned on the other side around the axial line of the protruded part,
the first receiving part is constituted by a wall surface positioned on one side around the axial line of the recessed part, and the second receiving part is constituted by a wall surface positioned on the other side around the axial line of the recessed part.

7. The linear drive device according to claim 1, wherein
the output shaft is provided between the first fixed shaft and the second fixed shaft, viewing from the axial direction.

8. The linear drive device according to claim 1, wherein
the output shaft is a motor shaft connected to the rotor to be integrally rotated with the rotor.

9. The linear drive device according to claim 1, wherein
the moved member is a nut member in which a second spiral groove which engages with the first spiral groove is formed on an inner peripheral face of a shaft hole through which the output shaft penetrates.

10. The linear drive device according to claim 1, wherein
an elastic member is provided in a portion interposed around the axial line by the moved member and the slider.

11. The linear drive device according to claim 1, wherein
an elastic member is provided in a portion interposed in the axial direction by the moved member and the slider.

* * * * *